(12) United States Patent
Fonville et al.

(10) Patent No.: US 8,882,927 B2
(45) Date of Patent: Nov. 11, 2014

(54) WINDSHIELD WIPER DE-ICING

(75) Inventors: Carl E. Fonville, Ann Arbor, MI (US); Michael A. Karram, Flint, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 739 days.

(21) Appl. No.: 12/611,079

(22) Filed: Nov. 2, 2009

(65) Prior Publication Data

US 2010/0101604 A1 Apr. 29, 2010

Related U.S. Application Data

(62) Division of application No. 10/867,584, filed on Jun. 14, 2004, now abandoned.

(51) Int. Cl.
*B60S 1/02* (2006.01)
*B60S 1/52* (2006.01)
*B60S 1/48* (2006.01)

(52) U.S. Cl.
CPC .. *B60S 1/522* (2013.01); *B60S 1/52* (2013.01); *B60S 1/482* (2013.01); *B60S 1/487* (2013.01)
USPC ............ 134/6; 134/32; 239/284.1; 15/250.04

(58) Field of Classification Search
USPC .................... 134/6, 32; 239/284.1; 15/250.04
See application file for complete search history.

(56) References Cited

U.S. PATENT DOCUMENTS

| | | | |
|---|---|---|---|
| 2,280,400 A * | 4/1942 | Green | ......................... 15/250.04 |
| 5,509,606 A | 4/1996 | Breithaupt et al. | |
| 5,811,950 A * | 9/1998 | Lawson | ......................... 318/484 |
| 5,944,910 A | 8/1999 | Fujii | |
| 6,164,564 A * | 12/2000 | Franco et al. | .............. 239/284.1 |
| 6,236,019 B1 * | 5/2001 | Piccione et al. | .............. 219/203 |
| 6,237,861 B1 | 5/2001 | Northrop et al. | |
| 6,364,010 B1 | 4/2002 | Richman et al. | |

* cited by examiner

*Primary Examiner* — Michael Kornakov
*Assistant Examiner* — Douglas Lee
(74) *Attorney, Agent, or Firm* — Ingrassia Fisher & Lorenz, P.C.

(57) ABSTRACT

Methods and apparatus are provided for vehicle windshield washing-wiping and wiper de-icing. Primary nozzles provide washing fluid to the windshield during normal operations and secondary nozzles bathe the wiper arms with washing fluid to de-ice the wipers during a de-icing mode. Washing fluid is drawn from a reservoir and delivered to the nozzles by a pump. When the outside air temperature T is greater than Tc, the critical temperature for ice formation, the wipers and washing-wiping proceed normally with washing fluid delivered to the primary nozzles for windshield washing. When T≤Tc and the wipers are not moving, a washer fluid supply line valve delivers washing fluid to the secondary nozzles to de-ice the wipers. The wiper motor, washing fluid pump and valve are operated by a controller based on inputs from wiper position and air temperature sensors, using predetermined information stored in on-board memory.

17 Claims, 5 Drawing Sheets

WINDSHIELD WIPER DE-ICING

CROSS-REFERENCES TO RELATED APPLICATIONS

This application is a division of U.S. application Ser. No. 10/867,584, filed on Jun. 14, 2004, which is incorporated herein by reference.

TECHNICAL FIELD

The present invention generally relates to vehicle windshield wiper systems, and more particularly, to windshield wiper and washer systems providing wiper blade de-icing.

BACKGROUND

It is well known in the art to provide vehicles with windshield wipers and windshield washers. In modern vehicles, the windshield washer nozzles are often mounted on the wiper blades so that they spray more of the washer fluid on the windshield where it is desired and inject less into the vehicle slipstream. Examples of various windshield wiping-washing arrangements are described in Patents GB 430366 to Rawlinson, U.S. Pat. No. 2,961,168 to Webb, U.S. Pat. No. 3,213,493 to Chichester, U.S. Pat. No. 3,230,564 to McDevitt, U.S. Pat. No. 6,234,410 B1 to Martin et al, and U.S. Pat. No. 6,082,636 to Yoshida et al. A wiper de-icing system is described in U.S. Pat. No. 6,438,789 B1.

FIG. 1 is a simplified representation of prior art vehicle windshield wiping-washing system 20 comprising windshield 22 and wiper assemblies 24, 24'. Wiper assembly 24 has oscillating wiper arm spindle 25, wiper arm 26, wiper blade support bracket 27, wiper blade 28 and spray nozzles 29 that emit spray 30 during the windshield washing mode. For convenience of explanation it is assumed that wiper assembly 24' is functionally identical to wiper assembly 24. FIG. 1 illustrates windshield wiping-washing system 20 during a typical prior art windshield wiping-washing operation while wiper assemblies 24, 24' are moving in directions 32, 32' while emitting washing fluid spray 30.

FIG. 2 is a simplified flow chart showing operating process 60 of prior art vehicle windshield wiping-washing system 20 of FIG. 1. Process 60 begins with START 61, which usually occurs on vehicle power-up. In WASH SWITCH ON ? query step 62, it is determined whether the operator has pressed the "wash windshield" switch or button (usually found on the wiper control stalk). If the outcome of query 62 is NO (FALSE) then as shown by path 62A, process 60 loops back to start 61. If the outcome of query 62 is YES (TRUE), this initiates the windshield washing cycle. START PUMP step 63 is executed causing the washer fluid pump to turn on and WW ON IN WINDSHIELD WASH MODE step 64 to be executed. (The abbreviation "WW" stands for "windshield wiper".). In step 64 causes the wipers to begin moving across the windshield, usually in a low speed mode, suitable for a wash cycle. WASH SWITCH STILL ON ? query 65 is then executed to determine whether the operator is still activating the "wash" switch. If the outcome of query 65 is YES (TRUE) then method 60 loops back as shown by path 65A and the pump and windshield wipers remain on. If the outcome of query 65 is NO (FALSE), then STOP PUMP step 66 is executed and the washing fluid pump shuts off, thereby terminating spraying of the windshield with washing fluid. The combination of steps 62-65 cause nozzles 29 to emit washing fluid spray 30 onto the windshield as long as the operator is activating the "wash" switch. After STOP PUMP step 66 washing fluid no longer flows to nozzles 29 and WW ON IN WINDSHIELD DRY MODE FOR TIME t1 step 67 is executed to dry the windshield for time duration t1. In step 67 the windshield wipers may be left in the same mode set in step 64 or changed to a different operating mode. The duration t1 may be selected by the designer, depending upon particular vehicle's requirements. Following the expiration of time duration t1, method 60 executes RETURN WW TO PRIOR MODE step 68 whereby it returns operation of the wipers to whatever state or mode they were in prior to initial query 62. Method 60 then returns to start 61 and initial query 62 as shown by path 69.

These systems generally work well as far as cleaning the windshield is concerned. However, present day wiper-washer systems still suffer from a number of limitations or disadvantages. A significant problem with such systems is that they permit ice build-up on the wiper blades during cold weather driving conditions. When that happens, the wipers blades tend to lose contact with the windshield because the ice can prevent the blade from flexing to follow the contour of the windshield. When this happens the wiping and/or washing action of the blades becomes progressively less effective. A smeared windshield and reduced visibility can result. This is a significant disadvantage. A limitation of prior art blade de-icing arrangements is that they are more complicated and more expensive that is desired.

Accordingly, it is desirable to provide an improved wiper-washer system that minimizes or eliminates blade icing in cold conditions. In addition, it is desirable that the blade de-icing apparatus and method be simple, rugged, reliable and require minimum modification of existing vehicle systems. Furthermore, other desirable features and characteristics of the present invention will become apparent from the subsequent detailed description and the appended claims, taken in conjunction with the accompanying drawings and the foregoing technical field and background.

BRIEF SUMMARY

An apparatus is provided for vehicle windshield washing-wiping and wiper de-icing. Primary wash-spray nozzles provide washing fluid to the windshield during normal washing operations. Secondary de-icing nozzles spray washing fluid on the wipers when the wipers are at rest. The best occurs when the outside air temperature drops below a critical temperature Tc for ice formation. Washing fluid is supplied to the nozzles by a pump coupled between a washing fluid reservoir and the nozzles. One or more valves in the washing fluid supply line(s) direct the washing fluid flow to the nozzles. There is desirably a sensor for determining outside air temperature, a wiper position sensor for determining when the wipers are at rest, a wiper actuation motor for running the wipers and a controller coupled to the pump, valve(s), sensors and wiper motor for managing the operation thereof.

A method is provided for operating a vehicle windshield washing-wiping and wiper de-icing system. In response to a user activating a 'wash' switch or equivalent, the washing fluid pump is turned on to start the washing (and de-icing) cycle. It continues to run as long as the user activates that switch. When the outside air temperature T is greater than Tc, the critical temperature for ice formation, the wipers and washing-wiping proceed normally. The running pump delivers washing fluid from the reservoir to the primary wash-nozzles for windshield washing and no fluid is delivered to the secondary de-icing nozzles. When T≤Tc and the wipers are not moving, a valve in the washer fluid supply line operates and the running pump delivers washing fluid to the secondary nozzles to de-ice the wipers and/or reduce ice formation thereon. In the preferred embodiment, the secondary de-icing nozzles do not operate during normal washing operations and the primary wash-nozzles do not operate during de-icing, but this is not essential. When the user releases the 'wash' actuator, the pump shuts off, washing and de-icing stop and the wipers switch to a 'drying' mode for a time t1. Thereafter, the system preferably resets to whatever state or mode it was in prior to initiation of the wash cycle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

The words "rest" or "pause" or "retracted" are used interchangeably herein to refer to the position or status of the wipers generally when motion is temporarily stopped during intermittent operation and the word "stowage" is used generally to refer to the wiper position or status when the wipers are OFF.

Figure 1:
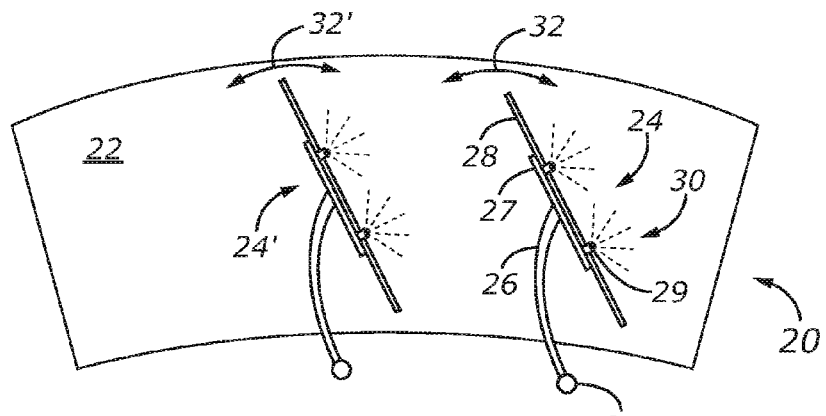
FIG. 1 is a simplified representation of a prior art vehicle windshield wiping-washing system.
Figure 3:
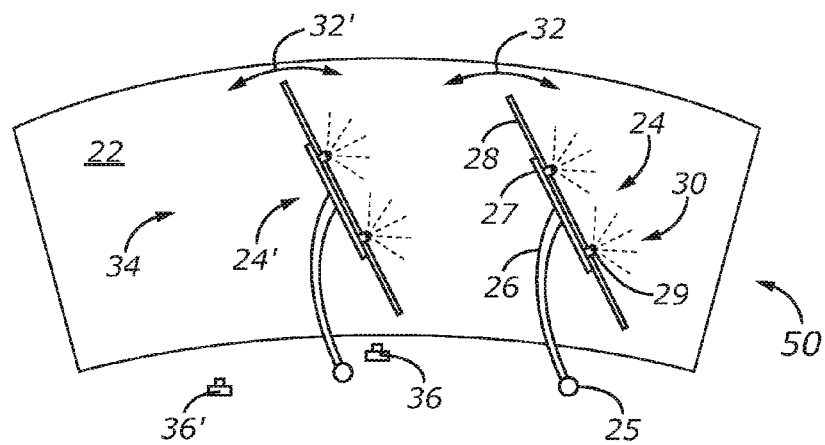
FIGS. 3-4 are simplified illustrations of the windshield wiping-washing and wiper de-icing system of the present invention for different wiper arm positions.
Figure 4:
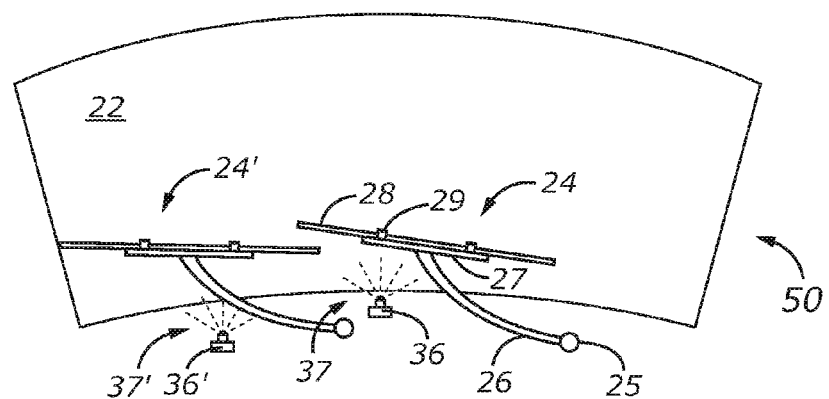
Figure 2:
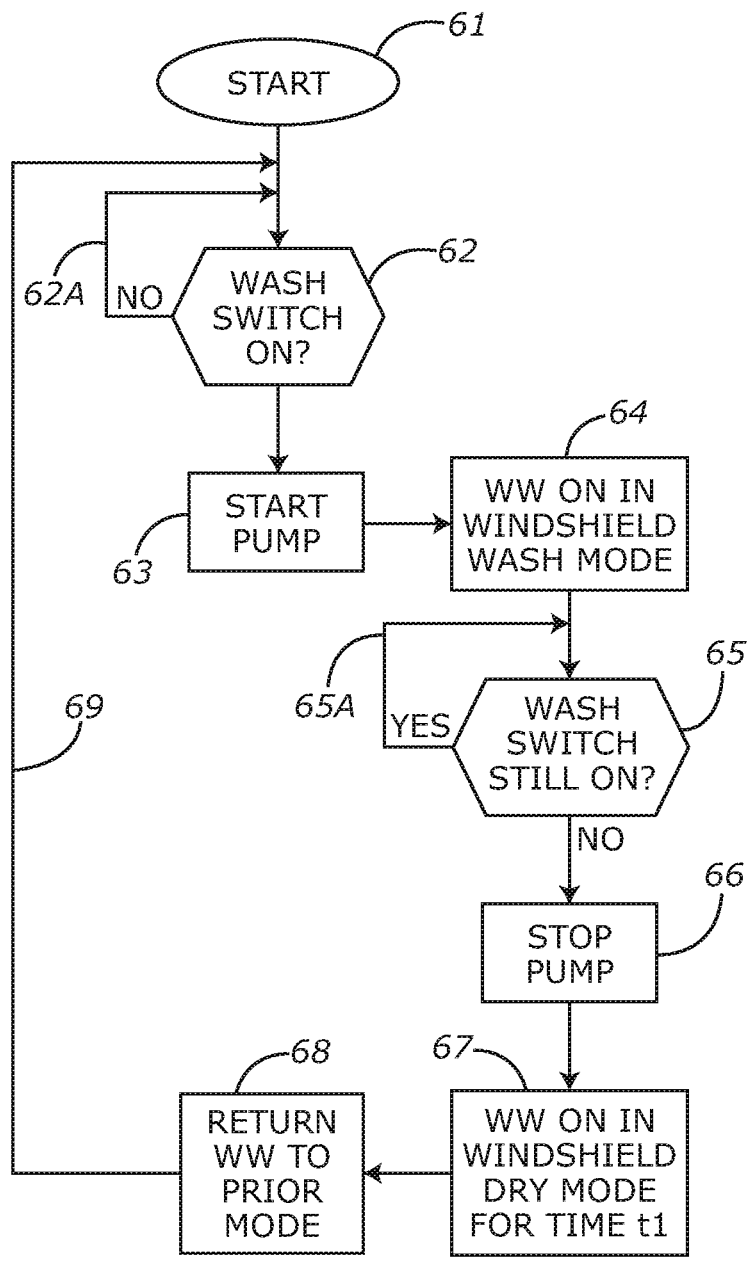
FIG. 2 is a simplified flow chart showing an operating process of the prior art vehicle windshield wiping-washing system of FIG. 1.

FIGS. 3-4 are simplified representations of the windshield wiping-washing and wiper de-icing system 50 of the present invention for different wiper arm positions 34, 35. In FIG. 3, wiper assemblies 24, 24' are shown in standard wiping-washing state 34, similar to that shown in FIG. 1, that is, wiper assemblies 24, 24' are up on the windshield moving according to arrows 32, 32' and emitting washing fluid sprays 30. This is analogous to the normal wiping-washing mode illustrated in FIG. 1. However, system 50 differs from prior art system 20 in that, among other things, auxiliary de-icing spray nozzles 36, 36' are provided. Auxiliary de-icing spray nozzles 36, 36' spray wiper assemblies 24, 24' when they are in pause or stowage position 35 illustrated in FIG. 4. The washer fluid emitted as sprays 37, 37' contains an antifreeze compound and therefore acts to melt ice that has accumulated on wiper assemblies 24, 24'. When wiper assemblies 24, 24' are in retracted or stowage position 35, windshield washing sprays 30 are desirably turned off, but this is not essential.

Figure 5:
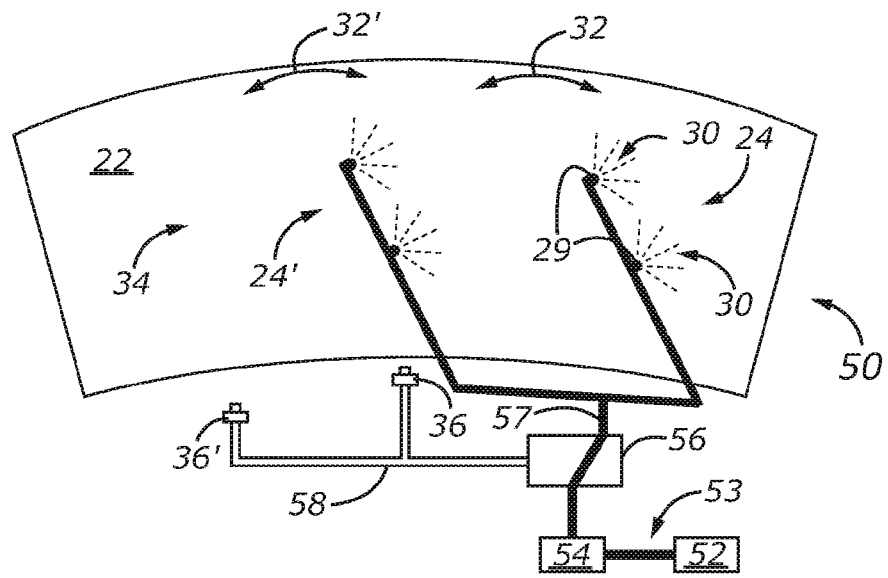
FIGS. 5-6 are simplified schematic piping diagrams of the windshield wiping-washing and wiper de-icing system of the present invention showing further details and illustrating washing fluid flow during different modes of operation.
Figure 6:
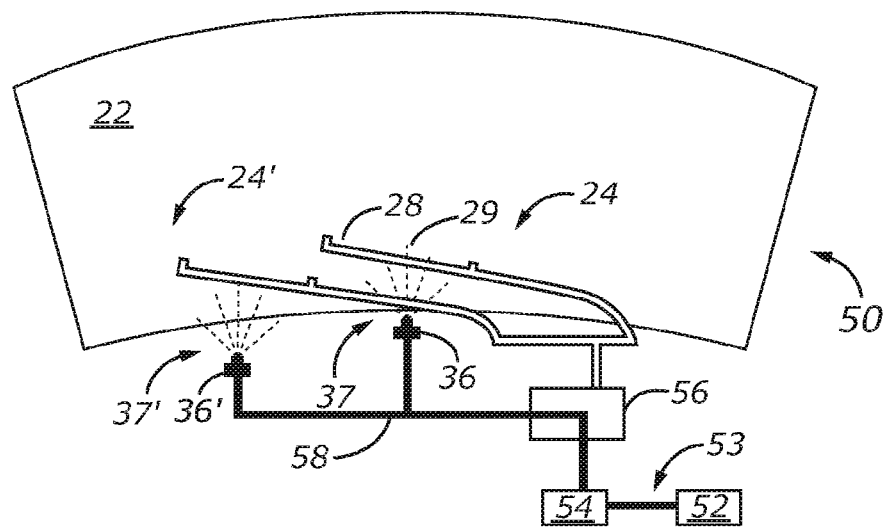

FIGS. 5-6 are simplified schematic piping diagrams of windshield wiping-washing and wiper de-icing system 50 of the present invention showing further details and illustrating washing fluid flow during different modes of operation. For clarity, the details of wiper arm spindle 25, wiper arm 26, wiper blade support bracket 27 and wiper blade 28 are omitted in FIGS. 5-6. As shown in FIGS. 5-6, system 50 of the present invention includes washing fluid reservoir 52, washing fluid pump 54, valve 56, and: (i) tubing or conduit 57 leading to wiper assemblies 24, 24' with spray nozzles 29 emitting washing fluid sprays 30 (see FIG. 5), and (ii) tubing or conduit 58 leading to nozzles 36 emitting washing fluid sprays 37 (see FIG. 6). For convenience of explanation and not intended to be limiting, it is assumed that wiper assembly 24' is like assembly 24 and operates in substantially the same way and likewise for nozzles 36', 36 and sprays 37', 37. For convenience of description, unless otherwise expressly indicated, reference numbers 24, 36, 37 are intended to include their primed equivalents 24', 36', 37'.

In FIGS. 5-6 heavier dark lines are used to illustrate the paths followed by windshield washing fluid 53 from reservoir 52, through pump 54 and valve 56 to wiper assembly spray nozzles 29 in FIG. 5 or auxiliary de-icing spray nozzles 36 in FIG. 6. FIG. 5 illustrates washing fluid flow during normal wiping-washing mode of operation. In FIG. 5 washing fluid 53 flows from pump 54 through valve 56 through channel 57 to wiper assembly 24 and nozzles 29, which produce sprays 30. FIG. 6 illustrates the arrangement of parts and washing fluid flow during the wiper de-icing operation of the present invention. In FIG. 6 washing fluid 53 flows from reservoir 52 through pump 54, through valve 56 and conduit 58 to nozzles 36, which produce sprays 37. Nozzles 36 are arranged with respect to wiper assembly 24 in retracted or rest position 35 so as to maximize coverage of wiper assemblies 24 by sprays 37, especially coverage of support brackets 27 and blades 28 where ice formation can have the largest impact.

In FIGS. 5-6 valve 56 is assumed to be a two position exclusive OR valve, that is, washing fluid 53 flows either to nozzles 29 or nozzles 36 but not to both nozzles 29 and 36 at the same time. However, this is merely for convenience of description and not intended to be limiting. Persons of skill in the art will understand based on the description herein that valve 56 may, alternatively, be such that washing fluid 53 flows to nozzles 29 for sprays 30 whenever pump 54 is on and that valve 56 only switches on and off sprays 37. Either arrangement is useful. Still further, persons of skill in the art will understand based on the description herein that valve 56 may embody two independent valves, one for nozzles 36 and sprays 37 and another for nozzles 29 and sprays 30, but this is not essential. A dual valve arrangement has the advantage of flexibility of operation since sprays 30 and 37 may be independently controlled. In the preferred mode of operation sprays 37 come on when wiper assembly 24 is in retracted position 35 and sprays 30 come on when wiper assembly 24 is in wiping position 34 and the user has activated the "wash" mode switch.

Figure 7:
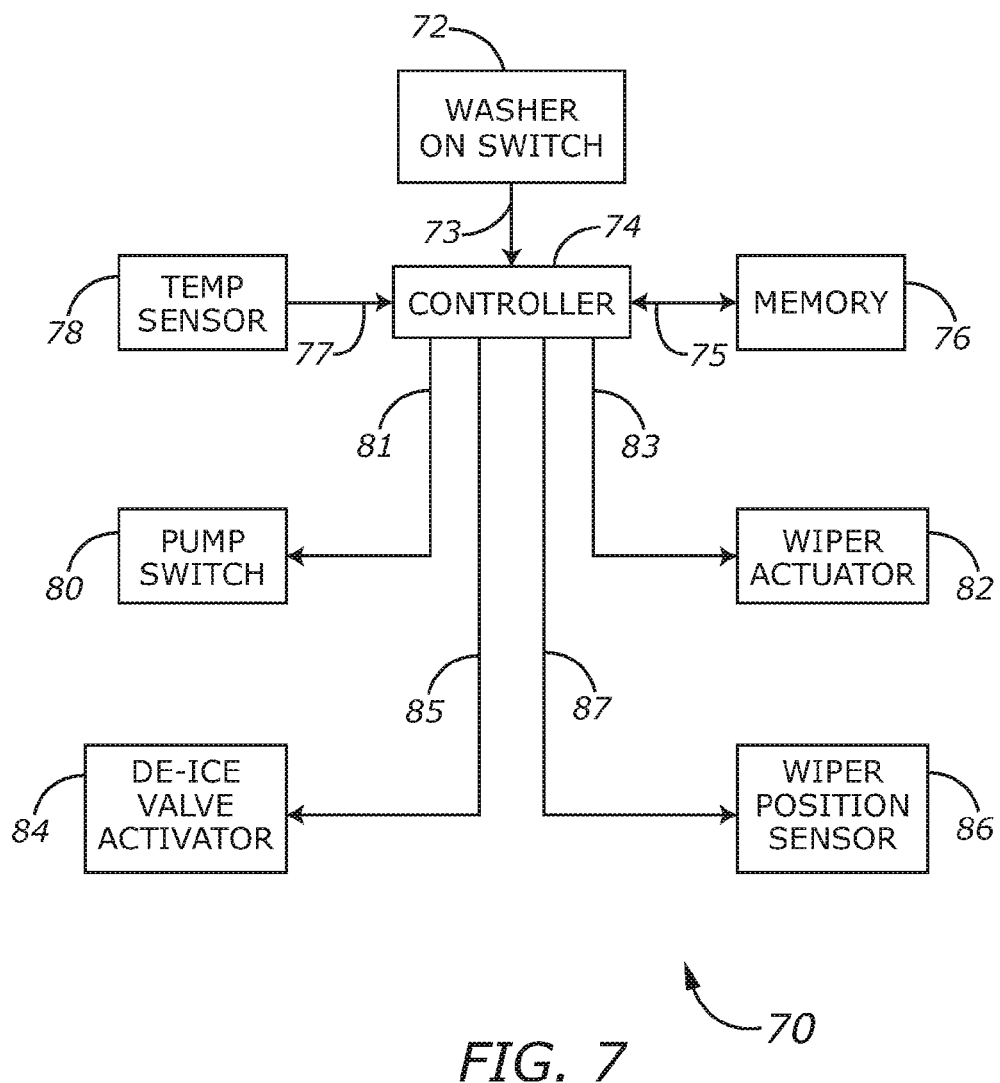
FIG. 7 is a simplified electrical schematic diagram of a control system for the wiping-washing and wiper de-icing system of the present invention.

FIG. 7 is a simplified electrical schematic diagram of control system 70 useful for wiping-washing and wiper de-icing system 50 of the present invention. System 70 comprises washer-on switch 72 (the "wash" mode switch) coupled to controller 74 by bus or leads 73, memory 76 coupled to controller 74 by bus or leads 75, temperature sensor 78 coupled to controller 74 by bus or leads 77, washer fluid pump switch 80 coupled to controller 74 by bus or leads 81, wiper actuator 82 coupled to controller 74 by bus or leads 83, de-ice valve activator 84 coupled to processor 74 by bus or leads 85 and wiper position sensor 86 coupled to processor 74 by bus or leads 87. Wiper actuator 82 and wiper position sensor 86 may be integrated in the same housing or interconnected as shown by bus or leads 89. Washer-on switch 72 is what the operator uses to initiate a windshield washing operation, that is, to launch a wash cycle or wash mode. Memory 76 stores operating programs (e.g., see FIG. 7), predetermined constants (e.g., t1, tp, Tc, etc.) and intermediate variable values used by controller 74 of control system 70 in operating system 50. Pump switch 80 energizes pump 54 of FIGS. 5-6. Controller 74 manages overall operation of washer/wiper/de-icing system 50. Wiper actuator 82, e.g., a motor or motor assembly, causes wiper assembly 24 to move across windshield 22 in directions 32 and return to rest, pause and/or stowage position 35, under the control of controller 74. De-ice valve activator 84 opens and closes valve(s) 56 and wiper position sensor 86 monitors or determines the position of wiper assembly 24, that is, whether it is in wiping position 34 or in retracted or stowage position 35. Person of skill in the art will understand that the pause or rest position of wiper assembly 24 may be somewhat different than the stowage position. In general, in the rest or pause position, assembly 24 usually does not retracted as far toward or at the base of the windshield as in the stowage position. For the purposes of this invention, nozzles 36 may be located so that sprays 37 contact wiper assemblies 24 in either the pause or stowage positions or both according to the needs of the designer. Persons of skill in the art will also understand that different types valves may be used for valve(s) 56 and, as used herein, the words "de-ice valve actuator 84" are not intended to be limiting and are intended to include any type of mechanism as may be appropriate to operate the type of valve(s) 56 being used. The operation of system 70 will be more fully understood by reference to FIG. 8.

Control system 70 may be a fully software programmable system wherein program instructions are stored in memory 76 and executed by controller 74 or it may be a hardwired logic system or a combination thereof. Control system 70 may be a dedicated controller substantially dealing only with washing/wiping/de-icing system 50 or may be part of an overall or shared vehicle electronic system dealing with system 50 on a part time basis, or a combination thereof. The various elements of system 70 may be dumb, that is, operating entirely under the direction of controller 74 or may be smart, that is, containing some logical functions and/or timers. The various elements in system 70 may operate under the general direction of controller 74 but provide certain sub-functions (e.g., timing, critical value comparisons, etc.) on their own. Either arrangement is useful. Various time intervals or time durations mentioned herein, e.g., t1, tp, etc. may be measured using software loops or other programmable means or may be measured by separate hardware timers or combinations thereof. For example, dry-mode time duration t1 may be determined by controller 74 or may be determined by a timer built actuator 82 or elsewhere and the signals sent by controller 74 to operate actuator 82 adapted accordingly. Any and all of these variations are useful and persons of skill in the art will understand based on the description herein how to implement them depending upon the needs of their particular application.

Figure 8:
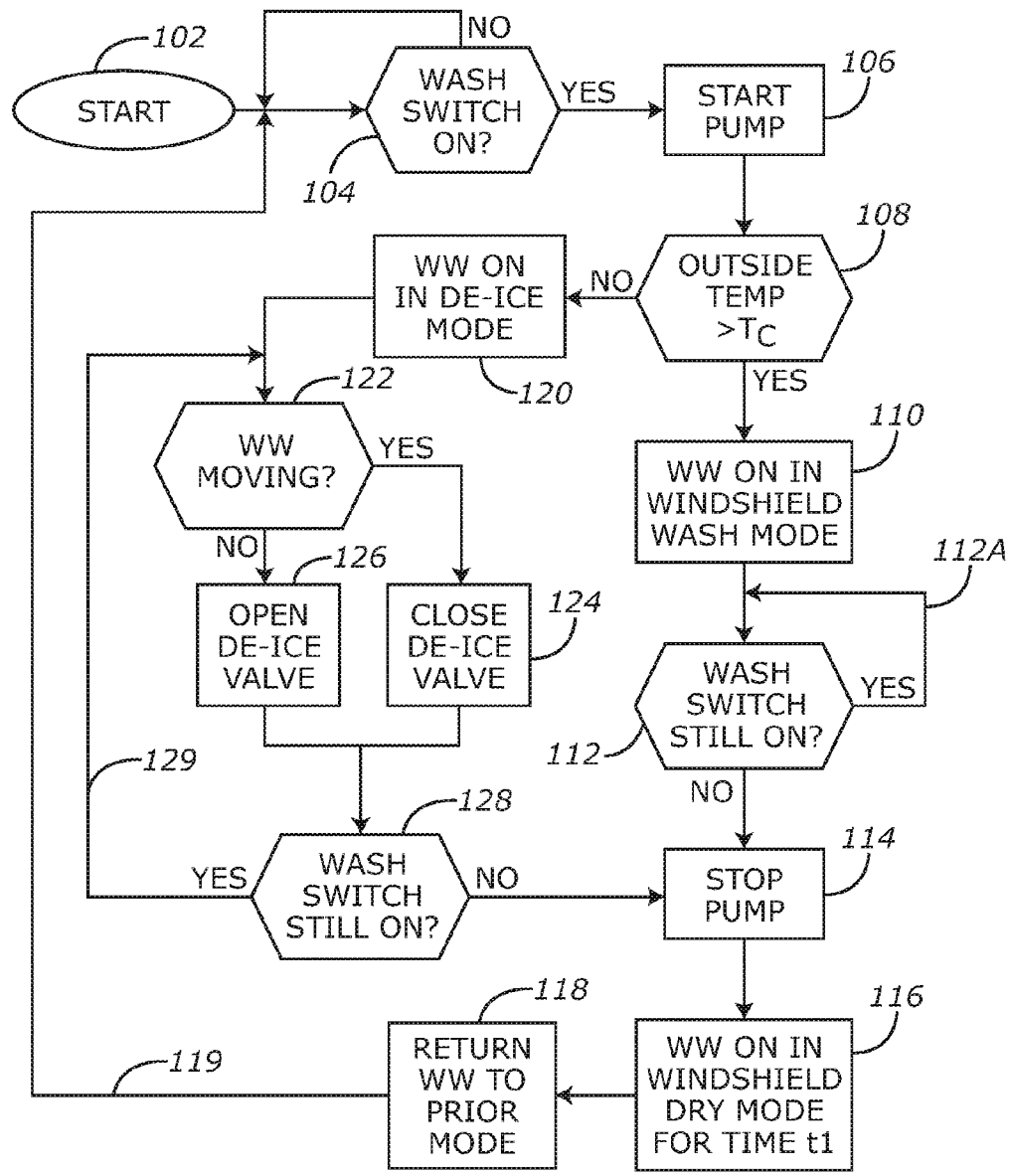
FIG. 8 is a simplified process flow chart of a method of operation of the wiping-washing and wiper de-icing system of the present invention, according to a preferred embodiment.

FIG. 8 is a simplified process flow chart of method 100 of operating wiping-washing and wiper de-icing system 50 of the present invention, according to a preferred embodiment. Method 100 is executed by control system 70 of FIG. 7 in combination with reservoir 52, pump 54 and valve(s) 56 of FIGS. 5-6. Method 100 begins with START 102 that desirably occurs at vehicle power-up, that is, when system 70 is energized when the vehicle is turned on. System 70 and method 100 are quiescent until the operator or other vehicle operator pushes or otherwise activates switch 72 to initiate a wash cycle, whereupon WASH SWITCH ON ? query 104 results in a YES (TRUE) outcome. (Prior to that query 104 returns a NO (FALSE) outcome and loops back to start 102.) Method 100 then progresses to START PUMP step 106 wherein, for example, controller 74 retrieves a "start wash" signal from switch 72 and sends an appropriate signal over bus or leads 81 to pump switch 80 thereby causing washing fluid pump 54 to start pumping fluid 53 from reservoir 52 through washing/de-icing system 50. This initiates the windshield washing process. As will be subsequently explained, washing fluid pump stays on as long as the operator continues to activate switch 72. Following START PUMP step 106, method 100 executes OUTSIDE TEMP>Tc? query 108 wherein it is determined whether or not the outside air temperature measured by temperature sensor 78 is greater than a predetermined critical Tc. Tc is the temperature at which there is a significant probability of ice formation on wiper assembly 24, and is generally in the range of 0° C. to −39° C., usually about 0° C. to −20° C. and more likely about −7° C. However, some ice formation may occur even though the average ambient temperature is ≥0° C. because heat loss from evaporation may lower the temperature of residual water on wiper assembly 24 or wiper assembly 24 itself to below 0° C. Therefore, setting Tc in the range about +5° C. to −5° C. is convenient, with about 0° C. preferred. Tc may be retrieved from memory 76 by controller 74 or may be stored in sensor 78. Either arrangement is useful.

If the outcome of query 108 is YES (TRUE) meaning that the outside air temperature is high enough that ice formation on wiper assembly 24 is unlikely, then method 100 proceeds to steps 110-118. Steps 110-118 are analogous to conventional wash cycle steps 64-68, respectively. WW ON IN WINDSHIELD WASH MODE step 110 is executed. (The abbreviation "WW" stands for "windshield wiper".). Step 110 causes the wipers to begin moving across the windshield, usually in a low speed mode, suitable for a wash cycle. WASH SWITCH STILL ON ? query 112 is then executed to determine whether the operator is still activating the "wash" switch. If the outcome of query 112 is YES (TRUE) then method 60 loops back as shown by path 112A and the pump and windshield wipers remain on. If the outcome of query 112 is NO (FALSE), then STOP PUMP step 114 is executed and the washing fluid pump shuts off, thereby terminating spraying of the windshield with washing fluid. The combination of steps 106-114 cause nozzles 29 to emit washing fluid spray 30 onto the windshield as long as the operator is activating the "wash" switch and the ambient temperature T>Tc. After STOP PUMP step 114 washing fluid no longer flows to nozzles 29 and WW ON IN WINDSHIELD DRY MODE FOR TIME t1 step 116 is executed to dry the windshield for time duration t1. In step 116 the windshield wipers may be left in the same mode set in step 110 or changed to a different operating mode. The duration t1 may be selected by the designer, depending upon the particular vehicle's requirements. Approximately 10 seconds is a non-limiting example of a useful time duration for t1, but larger or smaller values can also be used. Following the expiration of time duration t1, method 100 executes RETURN WW TO PRIOR MODE step 118 whereby it returns operation of the wipers to whatever state or mode they were in prior to initial query 104. Method 100 then returns to start 102 and initial query 104 as shown by path 119.

Most modern wiper systems can operate continuously at various speeds or in a pause or delay mode. In the delay mode, wiper assembly 24 operates in wiping position 34 for a predetermined wiping time and pauses in rest position 35 for a predetermined 'pause' time tp, and then repeats the sequence wipe-pause-wipe, etc. Returning now to query 108, if the outcome of query 108 is NO (FALSE), then method 100 proceeds to WW ON IN DE-ICE MODE step 120. The de-ice mode is preferably a minimum pause time operating mode, that is tp has its smallest value. Pause time tp may, for example, be retrieved by controller 74 from memory 76 or maybe built into actuator 82 or a combination thereof. Either arrangement is useful. Minimum pause times tp are conveniently in the range of 0 to 2 seconds, typically in the range of 0.1 to 1 seconds and preferably in the range of 0.25 to 0.50 seconds. Following step 120, system 50 prepares to de-ice wiper assemblies 24 by executing WW MOVING? query 122. In step 122, system 70 determines whether wiper assembly 24 is moving or not, e.g., stuck in the ice or temporarily paused. If the outcome of query 122 is YES (TRUE) indicating that wiper assemblies 24 are moving, then method 100 proceeds to step 124. In step 124 if de-ice valve 56 is already open to permit washer fluid 53 to flow to nozzles 36, then valve 56 is closed. If valve 54 is already closed, then in step 124, it remains closed. This is accomplished by controller 74 sending an appropriate signal to de-icing valve activator 84 controlling valve(s) 56.

If the outcome of query 122 is NO (FALSE) indicating that wiper assemblies 24 are not moving, e.g., one or both of assemblies 24, 24' are held fast by ice or in a temporary pause, then in step 126, de-icing valve activator 84 is energized to open valve 56 causing washer fluid 53 to flow to nozzles 36 so that sprays 37 are directed toward wiper assemblies 24 while in retracted or paused position 35. Following steps 124 or 126, WASH SWITCH STILL ON ? query 128 is executed wherein controller 74 determines the state of switch 72 (or 80). If the outcome of query 128 is NO (FALSE) indicating that the operator has released switch 72, then method 100 proceeds to STOP PUMP step 114, WW ON IN WINDSHIELD DRY MODE FOR TIME t1 step 116, RETURN WW TO PRIOR MODE step 118 and return to START 102 via path 119, as already discussed. If the outcome of query 128 is YES (TRUE) indicating that the operator has 'wash' switch 72 (and therefore pump switch 80) still activated, then method 100 loops back to step 122 as shown by path 129. As long as the operator continues to depress or otherwise activate switch 72, method 100 will activate sprays 37 whenever wiper assemblies 24 are paused or stuck in position 35 and thereby provide de-icing fluid to assemblies 24.

There are two scenarios of interest: First, if wiper assembly 24 is frozen, unable to move and is stuck in the pause or rest or stowage position, method 100 continues to bathe wiper assembly 24 in washing fluid de-icing spray 73 as long as switch 72 is activated; and Second, if wiper assembly 24 can move and shuttle back and forth in the direction of arrows 32, then in the de-ice mode provided by step 120, each time wiper assembly 24 stops in pause or rest position 35, valve 56 opens in response to step 126 and wiper assemblies 24 are bathed with washing fluid de-icing spray 73 during the pause interval. This serves to retard or prevent further ice buildup when the wipers are operating in cold weather conditions. Method 100 continues around this loop (steps 120, 122, 124/126, 128) until the operator releases switch 72 and pump 54 shuts off in step 114. Then, as already discussed, method 100 proceeds to WW ON IN WINDSHIELD DRY MODE FOR TIME t1 step 116, RETURN WW TO PRIOR MODE step 118 and then returns to START 102 as shown by path 119.

In the preferred embodiment, the operator controls the amount of windshield washer fluid by maintaining the switch 72 in the active position, but this is not essential. Alternatively, controller 74 or the vehicle computer can control the amount of windshield washer fluid delivered during the wash cycle and/or the de-ice cycle. This has the advantage that the state of the vehicle can be used to determine the time required for the various steps executed in method 100. For example and not intended to be limiting, the pump-on time and the wash and/or de-ice time can be made dependant on vehicle geometry, vehicle speed, wind speed, wiper speed, wiper motor feedback, windshield size, pump flow, ambient temperature, wash fluid composition, washer fluid temperature, other factors and/or combinations thereof. This allows the system to deliver an appropriate amount of fluid and wiper and/or de-ice cycle times as function of the current vehicle state. For example, when the vehicle is parked, the de-ice mode spray interval and the wipe intervals can be lengthened to help combat accumulating snow or other adverse conditions.

While at least one exemplary embodiment has been presented in the foregoing detailed description, it should be appreciated that a vast number of variations exist. For example, while operation of system 50 has been described in terms of nozzles 29 being mounted on wiper assemblies 24, this is not essential. Alternatively, nozzles 29 may be mounted on the vehicle itself, for example, at the periphery of windshield 22 and spray onto windshield 22 during the windshield washing cycle before or during wiper motion 32. Either arrangement is useful. It will also be noted that, in contrast to prior art wiper de-icing arrangements such as are described for example in U.S. Pat. No. 6,438,789 B1, nozzles 36 are preferably fixed and that a pop-up blade de-icing arrangement is not necessary. This significantly simplifies blade de-icing and is a significant advantage over the prior art.

It will be further noted that although in the preferred embodiment sensor 78 is used to measure ambient air temperature T and query 108 is executed in preferred method 100 to determine whether T>Tc, this is not essential. The present invention will also operate if temperature sensor 78 is omitted and query 108 is replaced with a timing or randomizing step that toggles method 100 between branches 110-112 and branch 120-128 (the branches rejoin at step 114) at periodic or random intervals. Some washing fluid will be wasted when freezing is unlikely, but this alternative arrangement provides a useful backup in case sensor 78 fails. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof

What is claimed is:

1. A method for washing-wiping of a windshield and de-icing of a wiper in a vehicle in response to a request, wherein the vehicle has a pump for selectively delivering a washing fluid to a primary nozzle configured to spray the washing fluid on the windshield and a secondary nozzle configured to spray the washing fluid on the wiper, the method comprising:
   starting the pump, and
   determining whether an outside air temperature T outside the vehicle is greater than a predetermined value Tc;
   and if T>Tc:
      running the wiper in a wash mode while the pump continues to run, delivering the washing fluid to the primary nozzle while the pump continues to run, and stopping the pump when the request ends;

else if T<Tc, then:

running the wiper in a de-icing mode while the pump continues to run, determining whether the wiper is moving, and if the wiper is not moving, delivering the washing fluid to the secondary nozzle while the pump continues to run; or if the wiper is moving, not delivering the washing fluid to the secondary nozzle; and stopping the pump when the request ends.

2. The method of claim 1 further comprising, following stopping the pump:

running the wiper in a further mode to promote drying of the windshield.

3. The method of claim 2 further comprising, upon stopping the pump:

returning operation of the wiper to whatever operating mode existed prior to the request.

4. The method of claim 1, further comprising the step of retrieving the predetermined value Tc from a memory.

5. The method of claim 1, further comprising the step of storing the predetermined value Tc in a sensor.

6. The method of claim 1, wherein:

the step of if the wiper is not moving, delivering the washing fluid to the secondary nozzle while the pump continues to run comprises the step of delivering the washing fluid to the secondary nozzle while the pump continues to run and the wiper is in a retracted or paused position; and the step of if the wiper is moving, not delivering the washing fluid to the secondary nozzle comprises the step of not delivering the washing fluid to the secondary nozzle while the wiper is not in the retracted or paused position.

7. The method of claim 1, wherein the predetermined value Tc is approximately zero degrees Celsius.

8. A system for controlling washing-wiping of a windshield and de-icing of a wiper in a vehicle in response to a request, wherein the vehicle has a pump for selectively delivering a washing fluid to a primary nozzle configured to spray the washing fluid on the windshield and a secondary nozzle configured to spray the washing fluid on the wiper, the system comprising:

a sensor configured to measure an outside air temperature T outside the vehicle; and a controller coupled to the sensor and configured to:

start the pump;

determine whether the outside air temperature T is greater than a predetermined value Tc;

and if T>Tc:

run the wiper in a wash mode while the pump continues to run, deliver the washing fluid to the primary nozzle while the pump continues to run, and stop the pump when the request ends;

else if T≤Tc, then:

run the wiper in a de-icing mode while the pump continues to run, determine whether the wiper is moving, and if the wiper is not moving, deliver the washing fluid to the secondary nozzle while the pump continues to run; or if the wiper is moving, not deliver the washing fluid to the secondary nozzle; and stop the pump when the request ends.

9. The system of claim 8, wherein the controller is further configured to run the wiper in a further mode to promote drying of the windshield following stopping the pump.

10. The system of claim 9, wherein the controller is further configured, upon stopping the pump, to return operation of the wiper to whatever operating mode existed prior to the request.

11. The system of claim 8, further comprising:

a memory configured to store the predetermined value Tc, wherein the controller is further configured to store the predetermined value Tc from the memory.

12. The system of claim 8, wherein the sensor is further configured to store the predetermined value Tc.

13. A system for washing-wiping a windshield and de-icing a wiper in a vehicle in response to a request, the system comprising:

a sensor configured to measure an outside air temperature T outside the vehicle;

a primary nozzle configured to spray a washing fluid on the windshield;

a secondary nozzle configured to spray the washing fluid on the wiper;

a pump configured to selectively deliver the washing fluid to the primary nozzle and to the secondary nozzle; and a controller coupled to the primary nozzle, the secondary nozzle, the sensor, and the pump, and configured to:

start the pump;

determine whether the outside air temperature T is greater than a predetermined value Tc;

and if T>Tc:

run the wiper in a wash mode while the pump continues to run, deliver the washing fluid to the primary nozzle while the pump continues to run, and stop the pump when the request ends;

else if T≤Tc, then:

run the wiper in a de-icing mode while the pump continues to run, determine whether the wiper is moving, and if the wiper is not moving, deliver the washing fluid to the secondary nozzle while the pump continues to run; or if the wiper is moving, not deliver the washing fluid to the secondary nozzle; and stop the pump when the request ends.

14. The system of claim 13, wherein the controller is further configured to run the wiper in a further mode to promote drying of the windshield following stopping the pump.

15. The system of claim 14, wherein the controller is further configured, upon stopping the pump, to return operation of the wiper to whatever operating mode existed prior to the request.

16. The system of claim 13, further comprising:

a memory configured to store the predetermined value Tc, wherein the controller is further configured to store the predetermined value Tc from the memory.

17. The system of claim 13, wherein the sensor is further configured to store the predetermined value Tc.

* * * * *